United States Patent
Kondo et al.

(10) Patent No.: US 6,307,560 B1
(45) Date of Patent: Oct. 23, 2001

(54) CLASSIFIED ADAPTIVE SPATIO-TEMPORAL FORMAT CONVERSION METHOD AND APPARATUS

(75) Inventors: Tetsujiro Kondo, Kanagawa (JP); James J. Carrig, San Jose, CA (US); Kohji Ohta, Tokyo (JP); Yasuhiro Fujimori, Cupertino, CA (US); Sugata Ghosal, San Jose, CA (US); Tsutomu Watanabe, Kanagawa (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/249,185

(22) Filed: Feb. 12, 1999

(51) Int. Cl.⁷ .............................. H04N 7/46; H04N 7/01; H04N 7/26

(52) U.S. Cl. ..................... 345/433; 345/148; 348/414; 348/443; 348/458; 348/620

(58) Field of Search ..................... 345/148, 153, 345/154, 433, 437, 438; 348/441–459

(56) References Cited

U.S. PATENT DOCUMENTS

| | | |
|---|---|---|
| 3,311,879 | 3/1967 | Daher . |
| 3,805,232 | 4/1974 | Allen . |
| 4,361,853 | 11/1982 | Remy et al. . |

(List continued on next page.)

FOREIGN PATENT DOCUMENTS

| | | | |
|---|---|---|---|
| 0 398 741 A | 11/1990 | (EP) . | |
| 0 527 611 | 8/1992 | (EP) | ................. H04N/9/80 |
| 0 558 016 | 2/1993 | (EP) | ................. H04N/7/133 |
| 0 566 412 A2 | 4/1993 | (EP) . | |
| 0 571 180 A2 | 5/1993 | (EP) . | |
| 0 592 196 A2 | 10/1993 | (EP) . | |
| 0 596 826 | 11/1993 | (EP) | ................. H04N/5/92 |
| 0 605 209 A2 | 12/1993 | (EP) . | |
| 0 610 587 | 12/1993 | (EP) . | |
| 0 597 576 A | 5/1994 | (EP) . | |
| 0 651 584 A2 | 10/1994 | (EP) . | |
| 0 680 209 | 4/1995 | (EP) | ................. H04N/5/91 |
| 0 746 157 A2 | 5/1996 | (EP) . | |
| 0 833 517 | 4/1998 | (EP) | ................. H04N/7/30 |
| 2 320 836 A | 11/1997 | (GB) . | |
| 7-67028 | 3/1995 | (JP) | ................. H04N/5/235 |
| WO96/07987 | 9/1995 | (WO) . | |
| WO99/21285 | 10/1998 | (WO) . | |
| 99 21090 A | 4/1999 | (WO) . | |

OTHER PUBLICATIONS

Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.

(List continued on next page.)

*Primary Examiner*—Bipin Shalwala
*Assistant Examiner*—David L. Lewis
(74) *Attorney, Agent, or Firm*—Blakely, Sokoloff, Taylor & Zafman

(57) ABSTRACT

A classified adaptive spatio-temporal creation process is utilized to translate data from one format to another. This process creates new pixels by applying a filter selected on an output pixel by pixel basis which has been adaptively chosen from an application-specific set of three-dimensional filters. In one embodiment, a standard orientation is chosen, which is defined according to each output data position. Input data is flipped to align the output data position with the output position of the standard orientation. A classification is performed using the flipped input data and an appropriate filter is selected according to the classification. The filter is then executed to generate the value of the output data point.

16 Claims, 10 Drawing Sheets

Spatial View

Spatial View

U.S. PATENT DOCUMENTS

| | | | |
|---|---|---|---|
| 4,381,519 | 4/1983 | Wilkinson et al. | 358/21 R |
| 4,419,693 | 12/1983 | Wilkinson et al. | 358/167 |
| 4,532,628 | 7/1985 | Matthews . | |
| 4,574,393 | 3/1986 | Blackwell et al. . | |
| 4,703,351 | 10/1987 | Kondo | 358/135 |
| 4,703,352 | 10/1987 | Kondo | 358/135 |
| 4,710,811 | 12/1987 | Kondo | 358/135 |
| 4,722,003 | 1/1988 | Kondo | 358/135 |
| 4,729,021 | 3/1988 | Kondo . | |
| 4,772,947 | 9/1988 | Kono | 358/135 |
| 4,788,589 | 11/1988 | Kondo | 358/133 |
| 4,815,078 | 3/1989 | Shimura | 370/30 |
| 4,845,560 | 7/1989 | Kondo et al. | 358/133 |
| 4,890,161 | 12/1989 | Kondo | 358/135 |
| 4,924,310 | 5/1990 | Von Brandt | 358/136 |
| 4,953,023 | 8/1990 | Kondo | 358/135 |
| 4,975,915 | 12/1990 | Sako et al. . | |
| 5,023,710 | 6/1991 | Kondo et al. | 358/133 |
| 5,086,489 | 2/1992 | Shimura . | |
| 5,093,872 | 3/1992 | Tutt . | |
| 5,101,446 | 3/1992 | Resnikoff et al. . | |
| 5,122,873 | 6/1992 | Golin . | |
| 5,134,479 | 7/1992 | Ohishi . | |
| 5,142,537 | 8/1992 | Kutner et al. | 371/31 |
| 5,150,210 | 9/1992 | Hoshi et al. . | |
| 5,159,452 | 10/1992 | Kinoshita et al. | 358/141 |
| 5,166,987 | 11/1992 | Kageyama . | |
| 5,177,797 | 1/1993 | Takenaka et al. . | |
| 5,185,746 | 2/1993 | Tanaka et al. . | |
| 5,196,931 | 3/1993 | Kondo | 358/133 |
| 5,208,816 | 5/1993 | Seshardi et al. | 371/43 |
| 5,221,966 * | 6/1993 | Clayton et al. | 348/443 |
| 5,237,424 | 8/1993 | Nishino et al. | 358/310 |
| 5,241,381 | 8/1993 | Kondo | 358/133 |
| 5,243,428 | 9/1993 | Challapali et al. . | |
| 5,258,835 | 11/1993 | Kato | 358/135 |
| 5,307,175 | 4/1994 | Seachman . | |
| 5,327,502 | 7/1994 | Katata et al. | 382/56 |
| 5,337,087 | 8/1994 | Mishima . | |
| 5,359,694 | 10/1994 | Concordel | 358/445 |
| 5,379,072 | 1/1995 | Kondo | 348/441 |
| 5,398,078 | 3/1995 | Masuda et al. | 348/699 |
| 5,406,334 | 4/1995 | Kondo et al. . | |
| 5,416,651 | 5/1995 | Uetake et al. | 360/48 |
| 5,416,847 | 5/1995 | Boze . | |
| 5,428,403 | 6/1995 | Andrew et al. | 348/699 |
| 5,434,716 | 7/1995 | Sugiyama et al. | 360/32 |
| 5,438,369 | 8/1995 | Citta et al. | 348/470 |
| 5,446,456 | 8/1995 | Seo . | |
| 5,455,629 | 10/1995 | Sun et al. . | |
| 5,469,216 | 11/1995 | Takahashi et al. | 348/441 |
| 5,469,474 | 11/1995 | Kitabatake . | |
| 5,471,501 | 11/1995 | Parr et al. | 375/354 |
| 5,473,479 | 12/1995 | Takahura . | |
| 5,481,554 | 1/1996 | Kondo | 371/53 |
| 5,481,627 | 1/1996 | Kim | 382/254 |
| 5,495,298 | 2/1996 | Uchida et al. . | |
| 5,499,057 | 3/1996 | Kondo et al. . | |
| 5,552,608 | 9/1996 | Shimizume | 371/40.3 |
| 5,557,420 | 9/1996 | Yanagihara et al. . | |
| 5,557,479 | 9/1996 | Yanagihara . | |
| 5,571,862 | 11/1996 | Williams et al. . | |
| 5,577,053 | 11/1996 | Dent . | |
| 5,594,807 | 1/1997 | Liu . | |
| 5,598,214 | 1/1997 | Kondo et al. | 348/414 |
| 5,617,333 | 4/1997 | Oyamada et al. . | |
| 5,625,715 | 4/1997 | Trew et al. | 382/236 |
| 5,636,316 | 6/1997 | Oku et al. . | |
| 5,649,053 | 7/1997 | Kim . | |
| 5,663,764 | 9/1997 | Kondo et al. | 348/414 |
| 5,673,357 | 9/1997 | Shima . | |
| 5,677,734 | 10/1997 | Oikawa et al. . | |
| 5,689,302 | 11/1997 | Jones . | |
| 5,699,475 | 12/1997 | Oguro et al. . | |
| 5,703,889 | 12/1997 | Shimoda et al. | 371/55 |
| 5,724,099 | 3/1998 | Hamdi et al. . | |
| 5,724,369 | 3/1998 | Brailean et al. . | |
| 5,737,022 | 4/1998 | Yamaguchi et al. . | |
| 5,751,361 | 5/1998 | Kim . | |
| 5,751,743 | 5/1998 | Takizawa | 371/41 |
| 5,756,857 | 5/1998 | Yamaguchi . | |
| 5,784,114 * | 7/1998 | Borer et al. | 348/443 |
| 5,790,195 | 8/1998 | Ohsawa . | |
| 5,793,435 * | 8/1998 | Ward et al. | 348/443 |
| 5,796,786 | 8/1998 | Lee | 375/326 |
| 5,805,762 | 9/1998 | Boyce et al. | 386/68 |
| 5,809,231 | 9/1998 | Yokoyama et al. . | |
| 5,844,569 * | 12/1998 | Eisler et al. | 345/433 |
| 5,844,619 * | 12/1998 | Songer | 348/443 |
| 5,852,470 | 12/1998 | Kondo et al. | 348/448 |
| 5,861,922 | 1/1999 | Murashita et al. . | |
| 5,878,183 | 3/1999 | Sugiyama et al. . | |
| 5,903,481 | 5/1999 | Kondo et al. . | |
| 5,936,674 | 8/1999 | Kim . | |
| 5,938,318 | 7/1999 | Araki . | |
| 5,946,044 | 8/1999 | Kondo et al. . | |
| 6,067,636 | 5/2000 | Yao et al. . | |

OTHER PUBLICATIONS

Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.
Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.
Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.
International Search Report PCT/US00/03743, 4 pp., Feb. 11, 2000.
R.C. Gonzalez, et al., "Digital Image Processing", Addison Wesley Publishing Company, Inc., 1992, pp. 346–348.

R. Aravind, et al., "Image and Video Coding Standards", AT&T Technical Journal, Jan./Feb. 1993, pp. 67–88.

Zhu, et al., "Coding and Cell–Loss Recovery in DCT–Based Packet Video", IEEE Transactions on Circuits and Systems for Video Technology, Jun. 3, 1993, No. 3, NY.

International Search Report, PCT/US98/22347, Mar. 16, 1999, 2 pp.

International Search Report, PCT/US95/22531, Apr. 1, 1999, 1 p.

International Search Report PCT/US98/22411, Feb. 25, 1999, 1 p.

NHK Laboratories Note, "Error Correction, Concealment and Shuffling", No. 424, Mar. 1994, pp. 29–44.

Translation of Japanese Patent #7–67028, 30 pp.

Kondo, et al., "Adaptive Dynamic Range Coding Scheme for Future Consumer Digital VTR", pp. 219–226.

Kim, et al., "Bit Rate Reduction Algorithm for a Digital VCR", IEEE Transactions on Consumer Electronics, vol. 37, No. 3, Aug. 1, 1992, pp. 267–274.

Kondo, et al., "Adaptive Dynamic Range Coding Scheme for Future HDTV Digital VTR", Fourth International Workshop on HDTV and Beyond, Sep. 4–6, Turin, Italy.

Kondo, et al., "A New Concealment Method for Digital VCR's", IEEE Visual Signal Processing and Communication, pp. 20–22, Sep. 1993, Melbourne, Australia.

Park, et al., "A Simple Concealment for ATM Bursty Cell Loss", IEEE Transactions on Consumer Electronics, No. 3, Aug. 1993, pp. 704–709.

Tom, et al., "Packet Video for Cell Loss Protection Using Deinterleaving and Scrambling", ICASSP 91: 1991 International Conference on Acoustics, Speech and Signal Processing, vol. 4, pp. 2857–2860, Apr. 1991.

International Search Report, PCT/US98/22412, Oct. 5, 1999, 5 pp.

Jeng, et al., "Concealment Of Bit Error And Cell Loss In Inter–Frame Coded Video Transmission", 1991 IEEE, 17.4.1–17.4.5.

Monet, et al., "Block Adaptive Quantization Of Images", IEEE 1993, pp. 303–306.

International Search Report PCT/US00/03439, Feb. 9, 2000, 8 pp.

International Search Report PCT/US00/03595, Feb. 10, 2000, 6 pp.

International Search Report PCT/US00/03611, Feb. 10, 2000, 8 pp.

International Search Report PCT/US00/03599, Feb. 10, 2000, 4 pp.

International Search Report PCT/US00/03742, Feb. 11, 2000, 5 pp.

International Search Report PcT/US00/03654, Feb. 10, 2000, 4 pp.

International Search Report PCT/US00/03299, Feb 9, 2000, 5 pp.

Meguro, et al., "An Adaptive Order Statistics Filter Based On Fuzzy Rules For Image Processing", pp. 70–80, XP–00755627, 1997 Scripta Technica, Inc.

International Search Report PCT/US00/03738, Feb. 11, 2000, 9 pp.

Stammnitz, et al., "*Digital HDTV Experimental System*", pp. 535–542.

International Search Report PCT/US00/03508, Feb. 9, 2000, 8 pp.

Chu, et al., Detection and Concealment of Transmission Errors in H.261 Images, XP–000737027, pp. 74–84, IEEE transactions, Feb. 1998.

Park, et al., "Recovery of Block–coded Images from Channel Errors", pp. 396–400, pub. Date May 23, 1993.

* cited by examiner

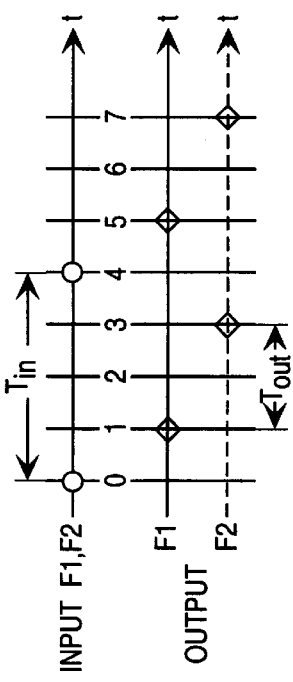
FIG. 3a Temporal View
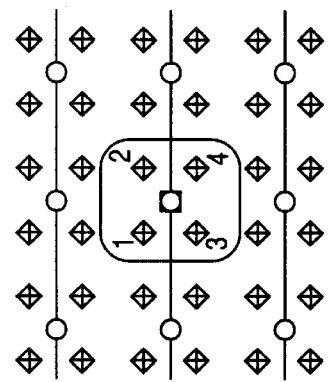
FIG. 3b Spatial View
☐ Reference input pixel and tap pixel
○ Input tap pixel
⊕ Output tap pixel
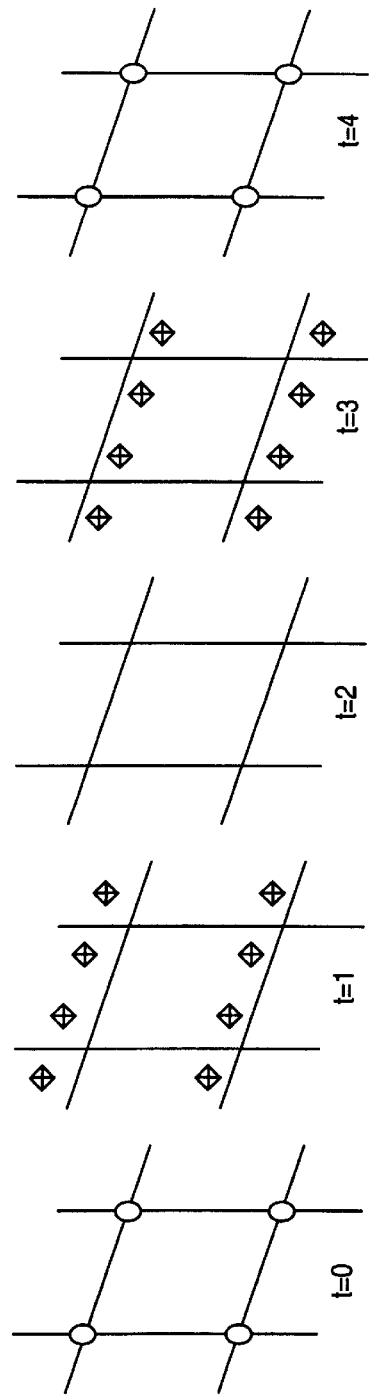
FIG. 3c Complete View

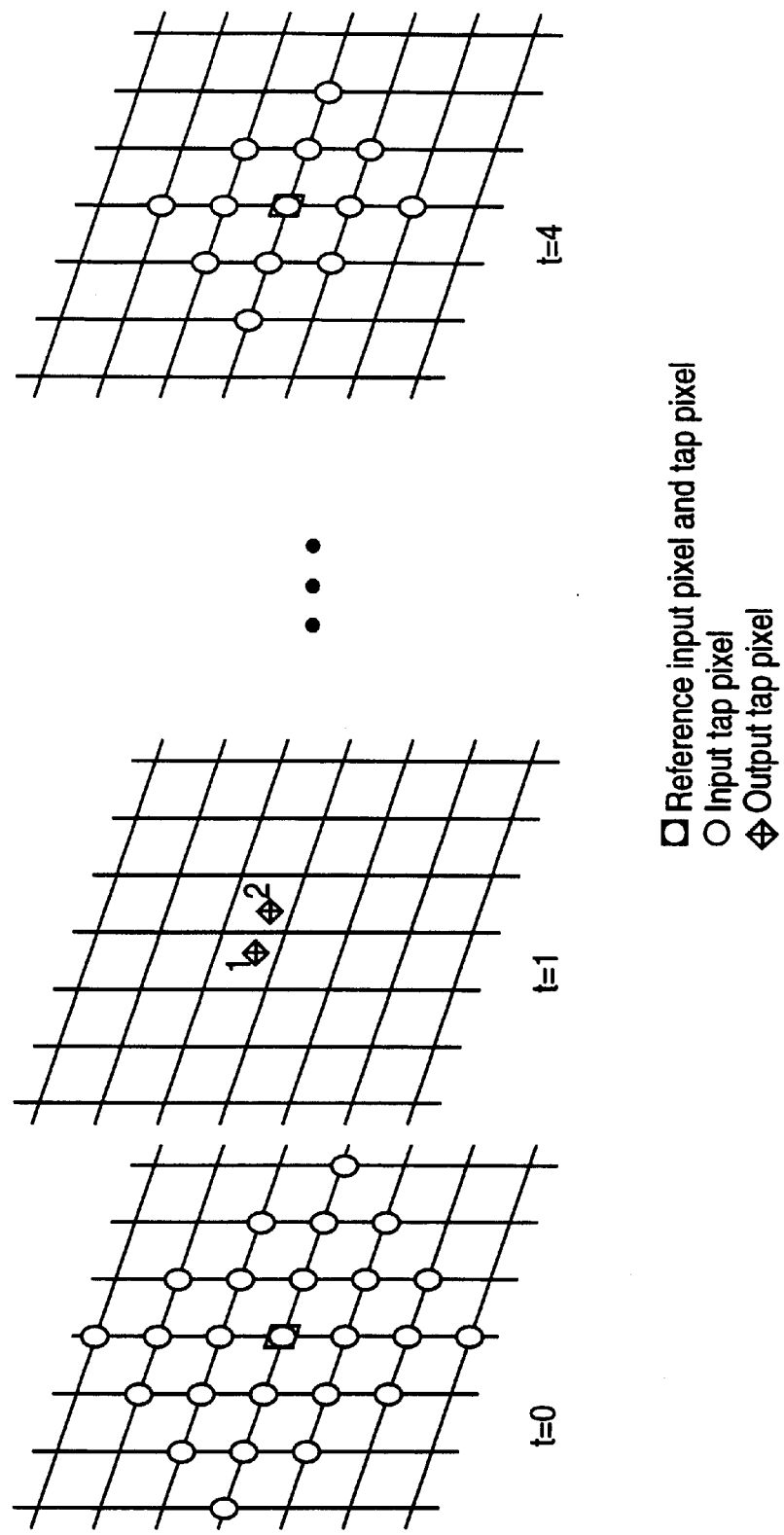
FIG. 3d Tap positions for outputs 1 and 2

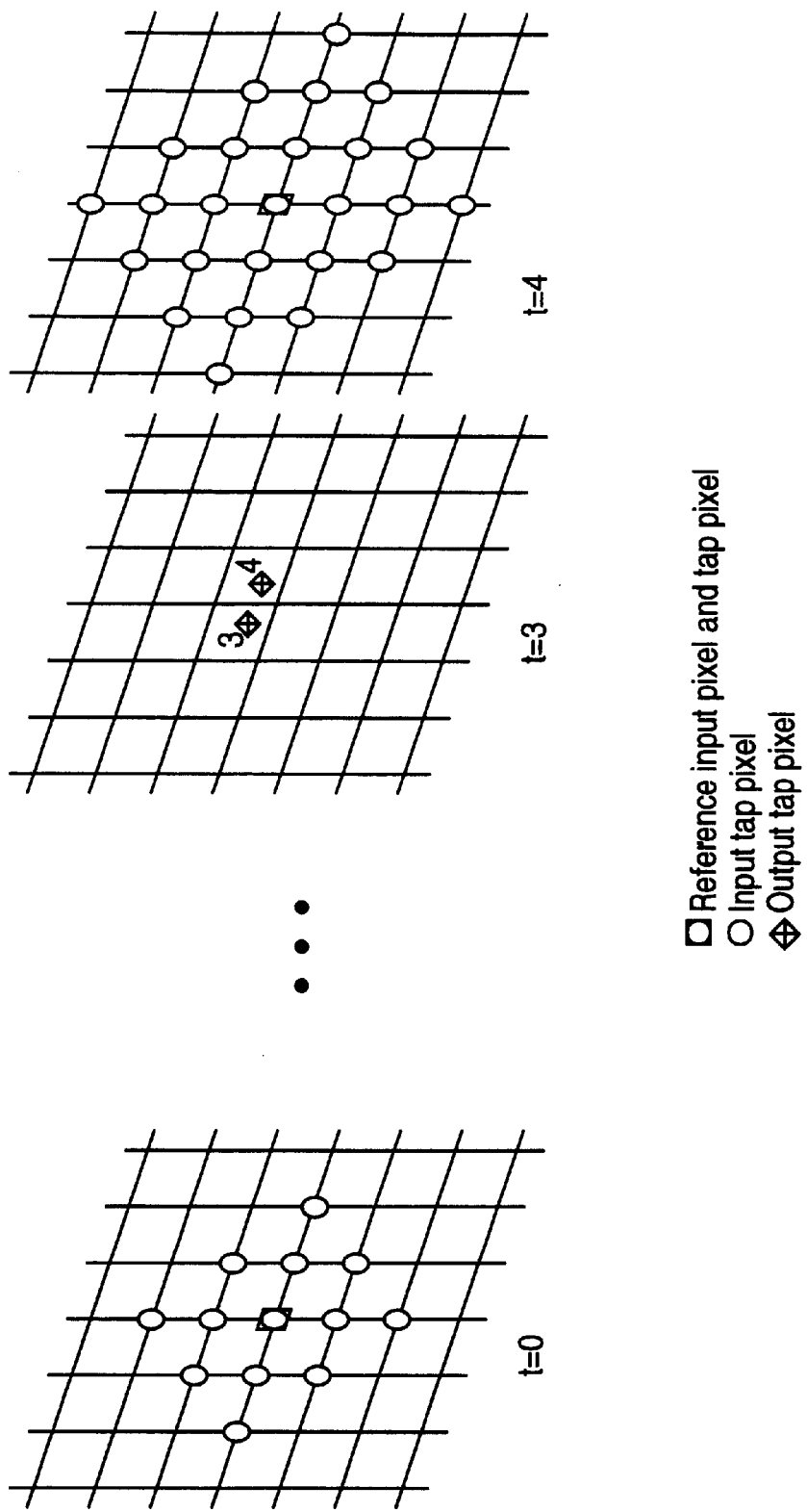
FIG. 3e Tap positions for outputs 3 and 4

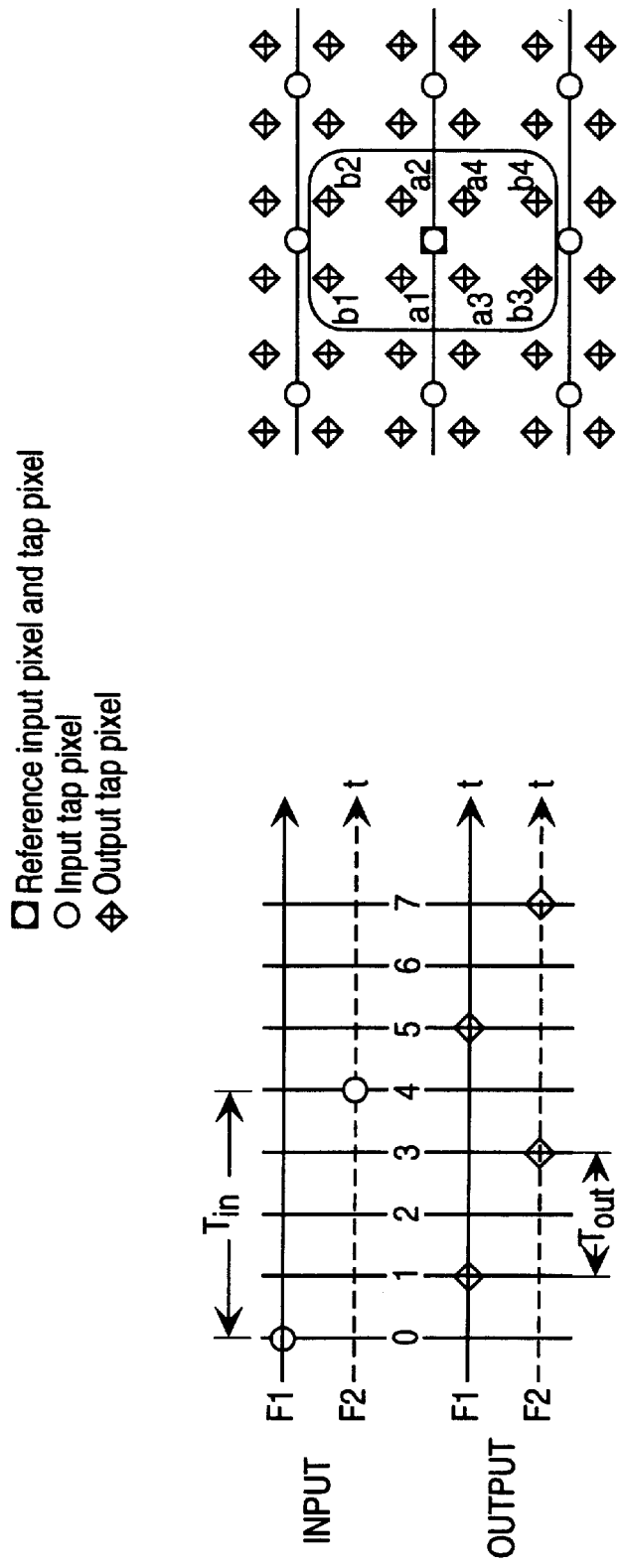
FIG. 4b Spatial View
FIG. 4a Temporal View

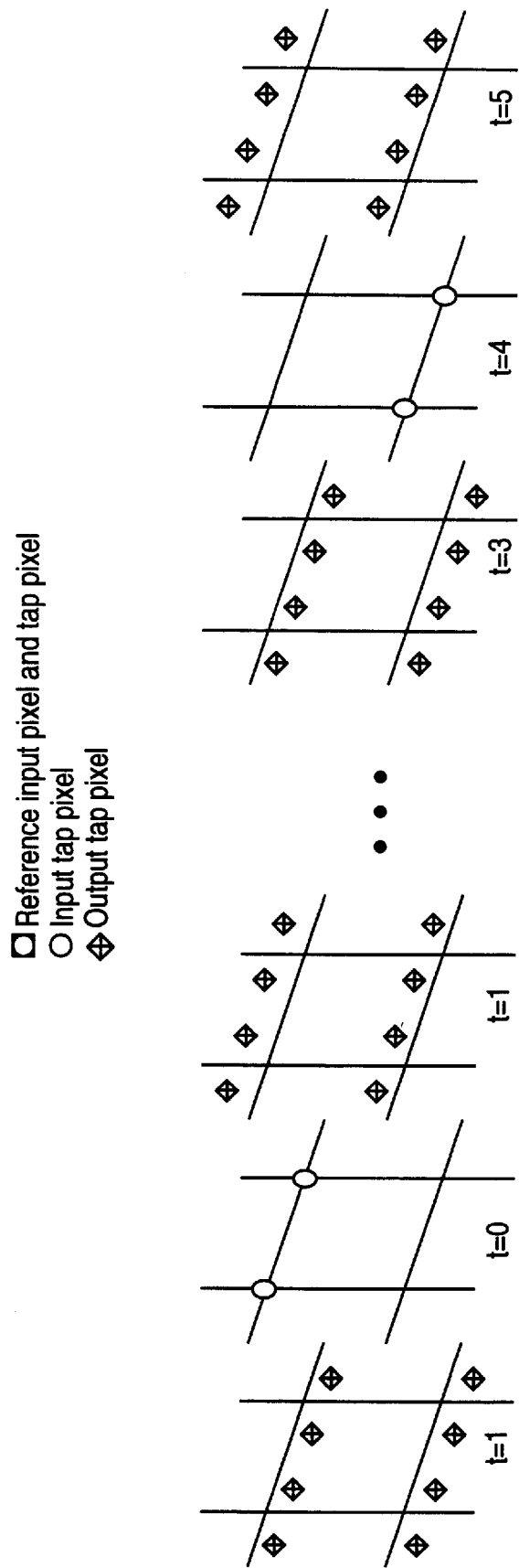
FIG. 4C Complete View

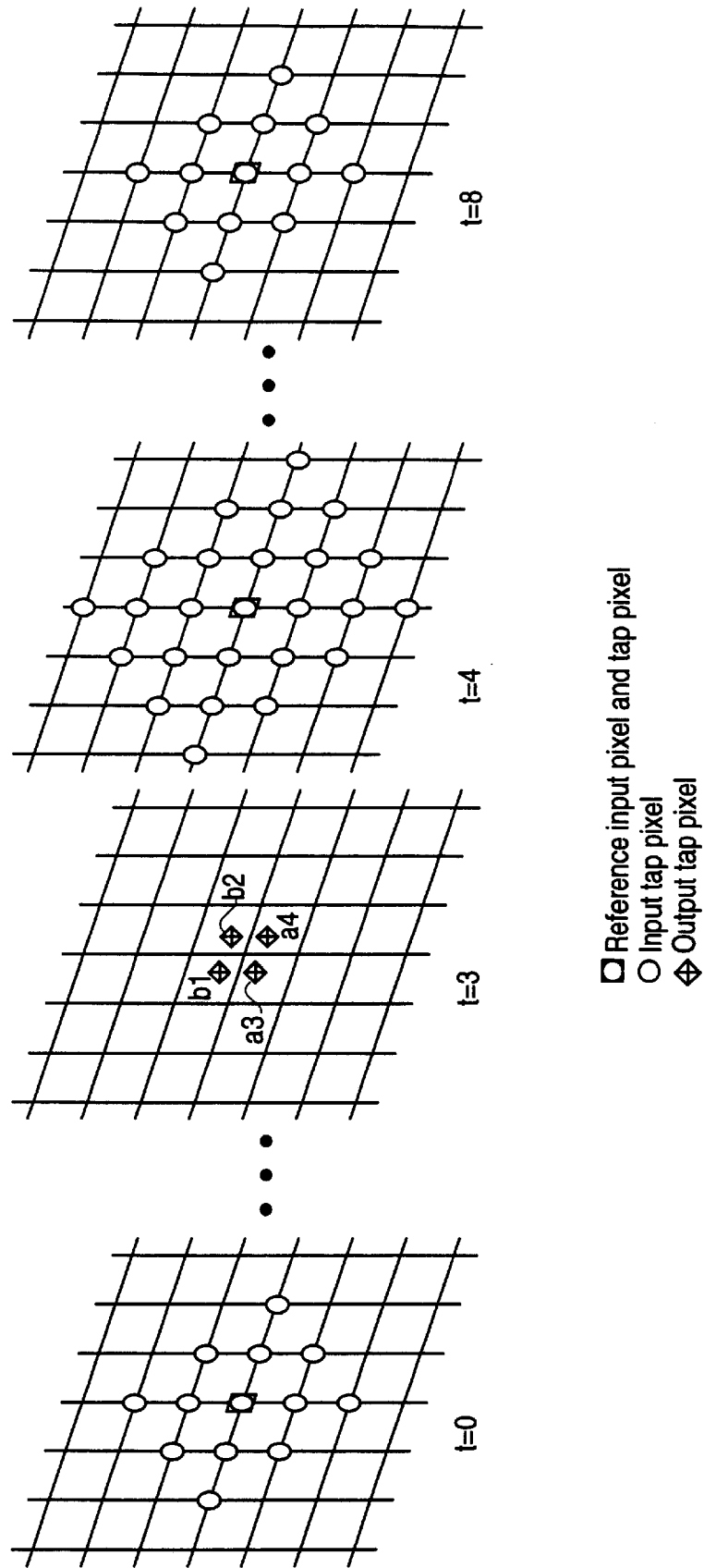
FIG. 4d Tap positions for outputs a3, a4, b1, and b2

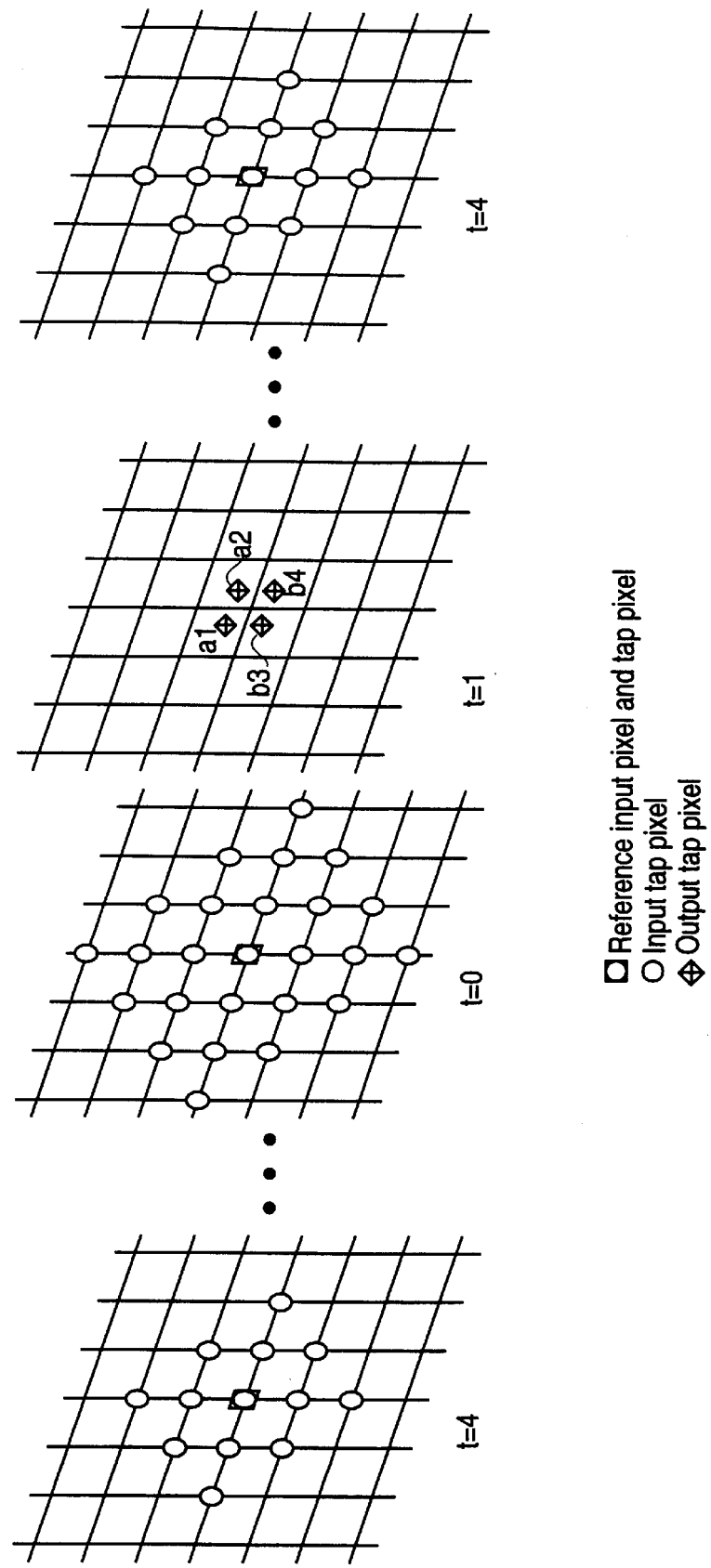
FIG. 4e Tap positions for outputs a1, a2, b3, and b4

CLASSIFIED ADAPTIVE SPATIO-TEMPORAL FORMAT CONVERSION METHOD AND APPARATUS

BACKGROUND OF THE INVENTION

1. Field of the Invention

The system and method of the present invention relates to the translation of correlated data from one format to another. More particularly, the system and method of the present invention relates to the application of classified adaptive filtering technology to the creation of image data at temporal and spatial coordinates that differ from those of the input data.

2. Art Background

For many applications, it is necessary to convert from one digital image format to another. These applications vary widely in conceptual difficulty and quality. Among the easiest conversions are those which do not require a change in data point location. For example, RBG to YUV format conversion, and GIF to JPEG format conversion do not require a change in data point location. Conversions which alter or reduce the number of data points are more difficult. This type of conversion occurs, for example, when an image is reduced in size. But, the most difficult type of image conversion is that which requires additional data points to be generated at new instances of time. Examples of these include converting film to video, video in PAL format to NTSC format, and temporally compressed data to a full frame-rate video.

Conventional techniques for creating data points at new instances in time include sample and hold, temporal averaging, and object tracking. The sample and hold method is a method in which output data points are taken from the most recently past moment in time. This method is prone to causing jerky motion since the proper temporal distance is not maintained between sample points.

Temporal averaging uses samples weighted by temporal distance. The primary advantage to this technique is that there is no unnatural jerkiness. One disadvantage is that there is a significant loss of temporal resolution that becomes especially apparent at the edges of fast moving objects.

Object tracking associates motion vectors with moving objects in the image. The motion vector is then used to estimate the object's position between image frames. There are two main drawbacks: it is computationally expensive, and the estimation errors may be quite noticeable.

SUMMARY OF THE INVENTION

A classified adaptive spatio-temporal creation process is utilized to translate data from one format to another. This process creates new pixels by applying a filter selected on an output pixel by pixel basis which has been adaptively chosen from an application-specific set of three-dimensional filters.

In one embodiment, the input data is spatially and temporally flipped as necessary to align the output data position with the output position of the standard orientation which is defined according to each output data position. A classification is performed using the flipped input data and an appropriate filter is selected according to the classification. The filter is then executed for the flipped input data to generate the value of the output data point.

BRIEF DESCRIPTION OF THE DRAWINGS

The objects, features and advantages of the present invention will be apparent from the following detailed description in which:

FIGS. 3a, 3b, 3c, 3d and 3e illustrate one example of conversion in accordance with the teachings of the present invention.

FIGS. 4a, 4b, 4c, 4d and 4e illustrate another example of data conversion in accordance with the teachings of the present invention.

DETAILED DESCRIPTION

The present invention provides for translation of data using classified spatio-temporal techniques. In one embodiment, the classified adaptive spatio-temporal format conversion process is used to convert from one video format to another. In one embodiment, on a pixel by pixel basis the conversion technique adaptively selects from a set of three dimensional linear filters and locally applies a selected filter to create output pixels. In one embodiment, multiple classes are used to select filters. In one embodiment spatial and temporal symmetries are used to reduce the number of filter sets required.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

The present invention is described in the context of video data; however, the present invention is applicable to a variety of types of correlated data including correlated and audio data.

Figure 1A:
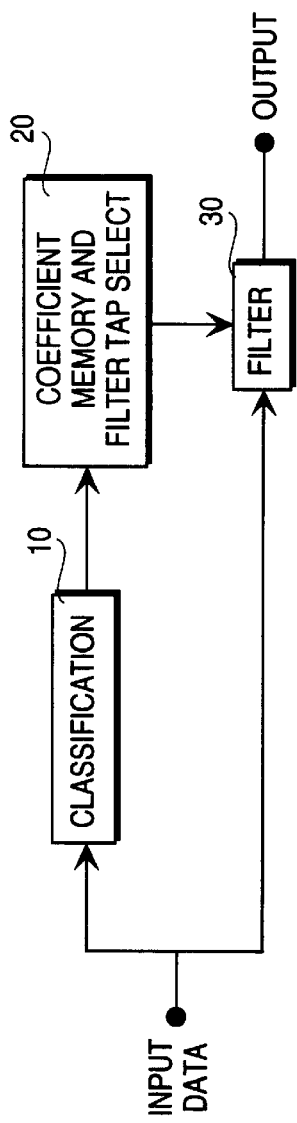
FIG. 1a is a simplified block diagram illustrating one embodiment of the system of the present invention.
Figure 1B:
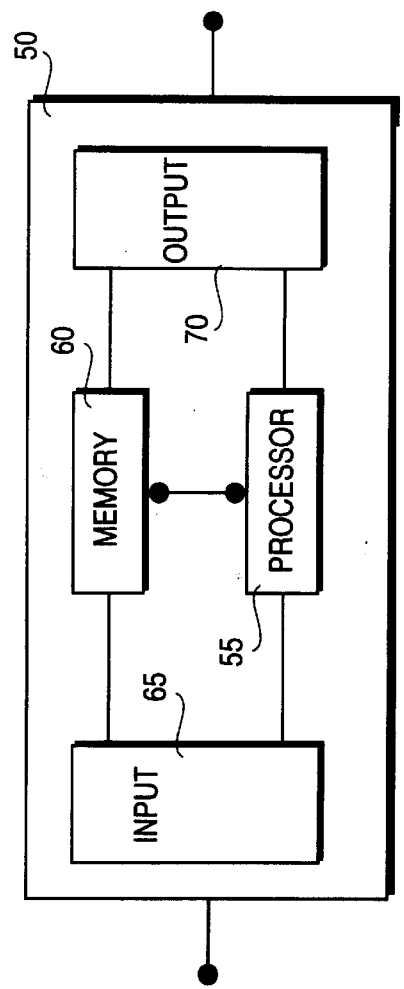
FIG. 1b is a simplified block diagram illustrating another embodiment of the system of the present invention.

One embodiment of the system of the present invention is illustrated in FIG. 1a. FIG. 1a is a simplified functional block diagram of circuitry that may be utilized to implement the processes described herein. For example, the circuitry may be implemented in specially configured logic, such as large scale integration (LSI) logic or programmable gate arrays. Alternately, as is illustrated in FIG. 1b, the circuitry may be implemented in code executed by a specially configured or general purpose processor, which executes instructions stored in a memory or other storage device or transmitted across a transmission medium. Furthermore, the present invention may be implemented as a combination of the above.

Referring to FIG. 1a, classification logic 10 examines the input data stream and classifies the data for subsequent filter selection and generation of output data. In one embodiment, data is classified according to multiple classes such as motion class and spatial class. Other classifications, e.g., temporal class, spatial activity class, etc., may be used.

Once the input data is classified, the input data filter taps and corresponding filter coefficients are selected by coefficient memory 20 and selection logic 21. As will be described below, the number of sets of filters can be reduced by taking advantage of spatial and temporal relationships between input and output data. Thus, in one embodiment selection logic may also perform data "flips" to align the output data position with the output position of a standard orientation which is defined for each output position. For purposes of discussion herein, a tap structure refers to the locations of input data taps used for classification or filtering purposes. Data taps refer to the individual data points, i.e., input data points collectively used to classify and filter to generate a specific output data point.

Filter 30 performs the necessary computations used to produce the output data. For example, in one embodiment, filter selection dictates the filter coefficients to utilize in conjunction with corresponding filter taps to determine output values. For example, an output value may be determined according to the following:

$$\text{output} = \sum_{i=1}^{t} w_i \cdot x_i$$

where t represents the number of filter taps, $x_i$ represents an input value, and $w_i$ represents a corresponding filter coefficient.

Filter coefficients may be generated a variety of ways. For example, the coefficients may be weights corresponding to spatial and/or temporal distances between an input data tap and a desired output data point. Filter coefficients can also be generated for each class by a training process that is performed prior to translation of the data.

For example, training may be achieved according to the following criterion.

$$\min_{w} \|X \cdot W - Y\|_2$$

where min represents a minimum function and X, W, and Y are, for example, the following matrices: X is an input data matrix, W is the coefficient matrix and Y corresponds to the target data matrix. Exemplary matrices are shown below:

$$X = \begin{pmatrix} x_{11} & x_{12} & \cdots & x_{1n} \\ x_{21} & x_{22} & \cdots & x_{2n} \\ \vdots & \vdots & \ddots & \vdots \\ x_{m1} & x_{m2} & \cdots & x_{mn} \end{pmatrix}$$

$$W = \begin{pmatrix} w_1 \\ w_2 \\ \vdots \\ w_n \end{pmatrix}$$

$$Y = \begin{pmatrix} y_1 \\ y_2 \\ \vdots \\ y_m \end{pmatrix}$$

The coefficient $w_i$ can be obtained according to this criterion, so that estimation errors against target data are minimized.

An alternate embodiment of the system of the present invention is illustrated by FIG. 1b. Processor system 50 includes processor 55, memory 60, input circuitry 65 and output circuitry 70. The methods described herein may be implemented on a specially configured or general processor. Instructions are stored in the memory 65 and accessed by processor 55 to perform many of the steps described herein.

Input 65 receives the input data stream and forwards the data to processor 55. Output 70 outputs the data translated in accordance with the methods described herein.

The method of the present invention provides a classified adaptive spatio-temporal format process that takes advantage of spatial and temporal symmetries among tap structures to reduce the number of filters required.

Figure 2A:
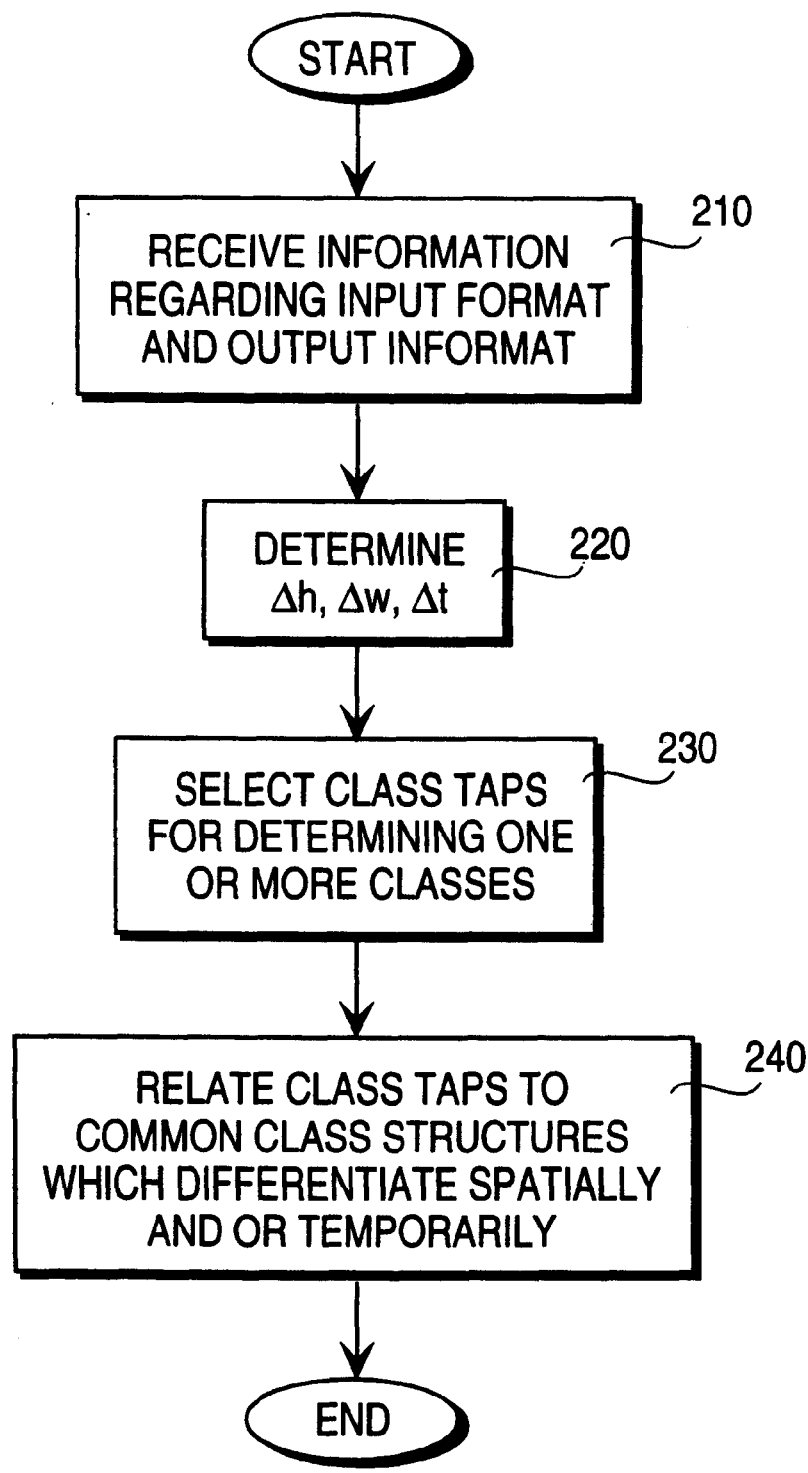
FIG. 2a is a simplified flow diagram illustrating one embodiment of a methodology to design a format conversion specification in accordance with the teachings of the present invention.

FIG. 2a is a simplified block diagram illustrating one embodiment of a methodology to design a format conversion specification. Although FIG. 2a is described as a process performed prior to the process of translation of data, the process may be performed at the time of translation of the data.

Most image formats may be easily described by reference to a commonly understood structural definition. The specifics of the format are given by parameters which refine that structure. For example, an image component is referred to as a 30 Hz, 480 line progressive image with 704 pixels per line, then every structural detail about this component is specified.

If the input image format is a structure of type Y with $H_{in}$ lines, $W_{in}$ pixels per line, and $T_{in}$ fractional seconds between fields and the output image format is a structure of type Z with $H_{out}$ lines, $W_{out}$ pixels per line, and $T_{out}$ fractional seconds between fields, the general conversion formula may be expressed mathematically as:

$$Z(H_{out}, W_{out}, T_{out}) = f[Y(H_{in}, W_{in}, T_{in}); \Delta h; \Delta w; \Delta t]$$

where $\Delta h$, $\Delta w$, and $\Delta t$ represent vertical, horizontal, and temporal shifts, respectively.

In the case of non-adaptive spatio-temporal format conversion, the function $f[\cdot]$ can be a three-dimensional linear filter. In one embodiment of adaptive spatio-temporal format conversion, the function $f[\cdot]$ is realized by selectively applying one of several filters. The technique is adaptive, because the filter selection is data-dependent on a pixel-by-pixel basis. The term classified refers to the manner in which the filter is selected.

Referring to FIG. 2a, at step 210, information regarding the input data format and output data format is received. For example, the input format may be a 30 Hz, 240 line progressive image with 704 pixels per line and the output format may be a 60 Hz 480 line interlaced image with 704 pixels per line.

At step 220, $\Delta h$, $\Delta w$ and $\Delta t$ are defined. While the input and output formats are specified by system constraints, the designer of the conversion system typically may specify $\Delta h$, $\Delta w$ and $\Delta t$. Generally, these should be chosen to satisfy certain symmetry constraints. These constraints ensure that only a minimum number of filters need be used, and that the output quality is as uniform as possible. Significant cost savings may be achieved by reducing the number of filter sets to use.

In all image conversion problems, the ratio of the number of output pixels per input pixel may be calculated. This ratio provides a convenient reference for designing the conversion specification. For the sake of discussion, assume that n pixels are output for every m pixels input. Then, after choosing a representative set of m pixels (from the same local area), the designer must find a corresponding set of n output pixels in the vicinity of the input pixels. If two of the output pixels are at the same spatio-temporal distance from the reference pixel, then the same set of filters can be used for their generation (assuming the surrounding conditions are also identical).

Horizontal, vertical, and temporal symmetry relations figure prominently at this point in the design, because they are used to equate the spatio-temporal distance between pixels. It is desirable, in one embodiment, to choose the offsets (Δh, Δw and Δt) with these symmetries in mind so that only a minimum number of spatio-temporal relationships are defined, thereby limiting the number of filter sets required.

At step 230, class taps are selected for determining one or more classes for filter selection. For purposes of discussion herein, pixels or data points used to classify the input data for filter selection are referred to as class taps. Input data used in the subsequent filter computation to generate output data are referred to as filter taps.

In one embodiment, a single type of class may be used. Alternately, multiple classes may be utilized to provide a combination classification. As noted earlier, a variety of types of classifications may be used; however, the following discussion will be limited to motion and spatial classification.

Motion classification takes place by considering the difference between same position pixels at difference instances of time. The magnitude, direction, or speed of image object motion is estimated around the output point of interest. Thus, the class taps encompass pixels from more than one instance of time. The number of class identifications (class ID) used to describe the input data can vary according to application. For example, a motion class ID of "0" may be defined to indicate no motion and a motion class ID of "1" may be defined to indicate a high level of motion. Alternately, more refined levels of motion may be classified and used in the filter selection process. The class taps used may vary according to application and may be selected according to a variety of techniques used to gather information regarding motion of the images. For example, in its simplest form, a motion class ID may be determined using an input pixel from a first period value of time and a second period of time.

Spatial classification concerns the spatial pattern of the input points that spatially and temporally surround the output point. In one embodiment, a threshold value is calculated as follows:

$$L=MIN+(MAX-MIN)/2$$

where MIN and MAX are the minimum and maximum pixel values taken over the spatial tap values. Each pixel of the tap gives rise to a binary digit—a 1 if the pixel value is greater than L and a 0 if the pixel value is less than L. When defining the spatial class, brightness (1's complement) symmetry may be used to halve the number of spatial classes. For example, spatial class 00101 and 11010 can be considered to be the same.

In one embodiment, motion classification and spatial classification may be combined on an output pixel by output pixel basis to determine a combined class which is used to select a filter from a set of filters for the particular class tap structure. For example, if a first level of motion is determined, spatial classification may case the selection of a combined class from a first set of combined class IDs; similarly, if a second level of motion is determined, spatial classification will cause the selection of a combined class from a second set of class IDs. As the number of class taps used can be large, at step 240 it is desirable to relate class taps to standard orientations to minimize the number of filter sets required. At step 241, filter coefficients are determined which correspond to each combination of spatial and/or temporal classes.

Figure 2B:
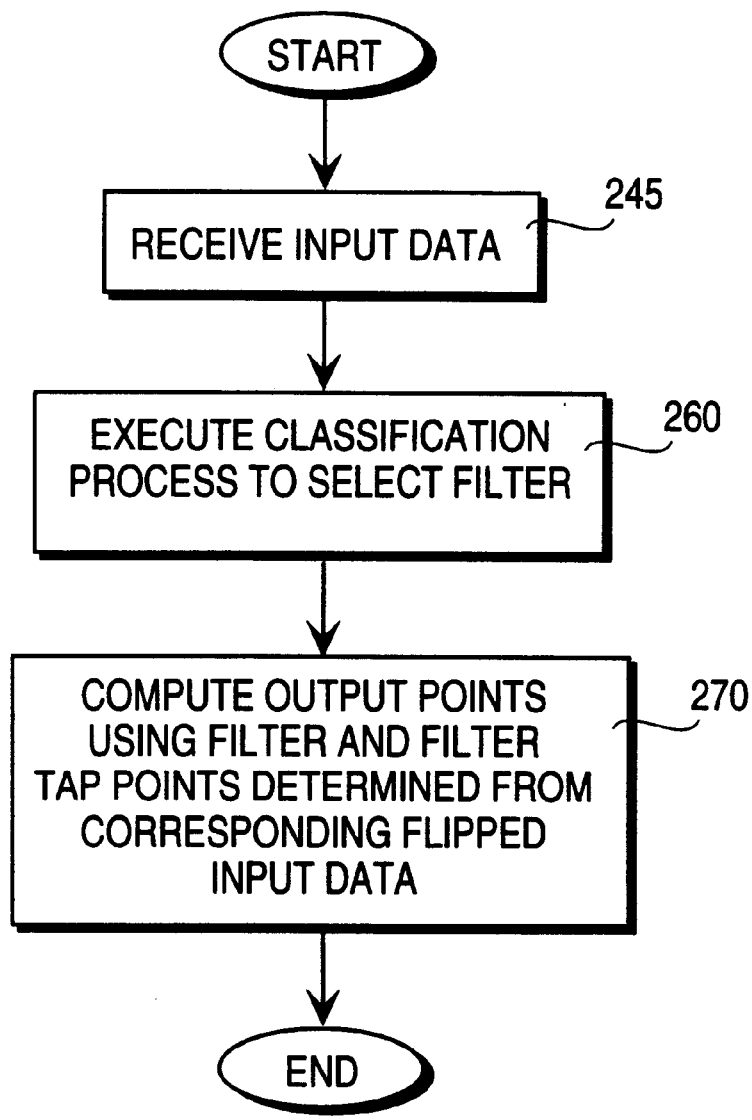
FIG. 2b is a simplified flow diagram illustrating one embodiment of the method of the present invention.

As noted earlier, Δh, Δw and Δt should be chosen to maximize symmetry wherein the tap structures vary by identified spatial and/or temporal differences. Once the symmetries are identified and correlated to standard orientations, data flips are selectively performed on the input stream to adjust the data to the selected standard orientations used. This is realized by reference to the process of FIG. 2b.

At step 245, the input data stream is received. The input data stream is in a known or determined format. Similarly, the desired output format is known or identified. Thus, the output data points or pixels are defined and the class taps used for filter selection are identified including the spatio-temporal relationships to a standard orientation. Thus, corresponding data flips, which may include vertical, horizontal and/or temporal flips of tap data are performed on selected input data to generate tap data used for classification, step 250.

At step 260, output data points are generated using filters selected on a pixel by pixel basis. In the present embodiment, filter selection includes the selection of filter coefficients and filter tap data selected from the input data. Once the input data is properly oriented, selected output points are flipped to place the output data at its proper location, step 270.

FIGS. 3a, 3b, 3c, 3d and 3e and FIGS. 4a, 4b, 4c, 4d and 4e illustrate two examples of conversion of data and the usage of common tap structures to minimize the number of filter sets required.

FIGS. 3a–3e define the desired input and output relationship of an exemplary spatio-temporal conversion system with progressive input. In this example, the input is converted from a progressively scanned image to a larger image in interlaced format. The number of pixels per line is increased by a factor of 2; the number of lines per frame is increased by a factor of 2; the number of fields per second is also increased by a factor of 2, but since there is a change from progressive to interlace structures, the overall number of frames per second is unchanged and therefore the effect is to generate 4 output pixels per pixel input. Using the notation of the general formula described above, Z is an interlace structure, Y is a progressive structure, and $H_{out}=2 H_{in}$, $W_{put}=2 W_{in}$, $T_{out}=T_{in}/2$, Δh is ¼ the inter-pixel vertical spacing, Δw is ¼ the inter-pixel horizontal spacing, and $\Delta t=T_{in}/4$.

Data from times 0 and 4 are used to generate outputs at times 1 and 3, as shown in FIG. 3a. The output points are purposely placed at equidistant points between the inputs. This not only serves to guarantee that the quality of the outputs at each time is equal, but it also allows temporal symmetry to be applied in order to halve the required number of filters. That is, the same set of filters that generate the data at time 1, may be used to generate the data at time 3 if the inputs from times 0 and 4 are interchanged.

Similarly, spatial symmetry is used to reduce the required number of filters. The four output positions in this example are defined by their proximity to the input data points. Referring to FIG. 3b, the center input point identified to be a reference point, and output point 1 is identified as the output position of reference when all the taps and filters are applied in their natural positions. Output point 2 is generated by using the same filters with the input data horizontally flipped. Output points 3 and 4 require both spatial and temporal flips, as is more easily seen by examining the sample taps in FIGS. 3d and 3e. Output point 3 requires that the data be flipped vertically and temporally since the output data is below the input and occurs at the complementary time. Output point 4 requires that the input data is flipped horizontally, vertically, and temporally. FIG. 3c provides a spatial and temporal view of input pixels and output pixels. FIGS. 3d and 3e illustrate the tap positions used to generate outputs 1, 2, 3 and 4.

FIGS. 4a–4e illustrate an example with interlaced input and output, as shown in FIG. 4a. In this example, the number of pixels per line is increased by a factor of 2; the number of lines per frame is increased by a factor of 2; the number of fields per second is also increased by a factor of 2. Since the format is unchanged, there are 8 output pixels per input pixel, as shown in FIG. 4b. This relationship is probably best understood by reference to the complete view shown in FIGS. 4d and 4e. In this view it can be seen that though output positions at times 1 and 5 are the same, their relationship to the input data is different. As a result, there are 8 output modes, labeled a1–a4, and b1–b4 (see FIG. 4b).

By looking to the symmetry conditions, the outputs at positions a1–a4 are all at the same spatio-temporal distance from the reference point and therefore may share the same set of filters, as indicated in FIGS. 4d and 4e. Similarly, another set of filters can be used to generate the outputs at positions b1–b4 since they are all at the same spatio-temporal distance from the reference point. In all, two disjoint sets of filters are needed to realize this conversion specification.

The invention has been described in conjunction with the preferred embodiment. It is evident that numerous alternatives, modifications, variations and uses will be apparent to those skilled in the art in light of the foregoing description.

What is claimed is:

1. A method for translating input data to output data, said method comprising the steps of:
   choosing a standard orientation of a given orientation pixel which is defined according to each output data position;
   flipping said input data to align said output data position with the output position of said standard orientation of the given orientation pixel;
   performing a classification using said flipped input data;
   selecting a filter according to said classification; and
   applying said filter to said flipped input data to generate the output data.

2. The method as set forth in claim 1, wherein the input data comprises a plurality of input data points and the output data comprising a plurality of output data points, said step of classifying comprising classifying relative to each output data point and said step of selecting, selecting a filter for generation of each output data point.

3. The method as set forth in claim 1, wherein the selected filter is a three dimensional filter.

4. The method as set forth in claim 1, wherein the type of classification performed is selected from the group comprising motion classification, spatial classification and a combination of motion and spatial classification.

5. The method as set forth in claim 1, wherein the correlated data is selected from a group comprising video data and audio data.

6. A system for translating correlated input data to output data, said system comprising:
   choosing logic configured to choose a standard orientation of a given orientation pixel which is defined according to each output data position;
   flipping logic configured to flip said input data to align said output data position with the output position of said standard orientation of the given orientation pixel;
   classification logic configured to perform a classification using said flipped input data;
   filter logic coupled to said classification logic, said filter logic configured to select a filter according to said classification and generate the output data using said selected filter.

7. The system as set forth in claim 6, wherein the classification logic and filter logic are selected from the group consisting of hardwired logic and a processor.

8. The system as set forth in claim 6, wherein the input data comprises a plurality of input data points and the output data comprising a plurality of output data points, said classification logic classifying relative to each output data point, said filter logic configured to select a filter for generation of each output data point.

9. The system as set forth in claim 6, wherein the type of classification performed is selected from the group comprising motion classification, spatial classification and a combination of motion and spatial classification.

10. The system as set forth in claim 6, wherein the correlated data is selected from a group comprising video data and audio data.

11. A computer readable medium comprising instructions which when executed in a processing system, perform a process for translating input data to output data, comprising:
   choosing a standard orientation of a given orientation pixel which is defined according to each output data position;
   flipping said input data to align said output data position with the output position of said standard orientation of the given orientation pixel;
   performing a classification using said flipped input data;
   selecting a filter according to said classification; and
   applying said selected filter to said flipped input data to generate the output data.

12. The computer readable medium as set forth in claim 11, wherein the input data comprises a plurality of input data points and the output data comprising a plurality of output data points and classifying comprises classifying relative to each output data point and selecting comprises selecting a filter for generation of each output data point.

13. The computer readable medium as set forth in claim 11, wherein the type of classification performed is selected from the group comprising motion classification, spatial classification and a combination of motion and spatial classification.

14. The computer readable medium as set forth in claim 11, wherein the correlated data is selected from a group comprising video data and audio data.

15. An apparatus for translating input data to output data comprising:
   means for choosing a standard orientation of a given orientation pixel which is defined according to each output data position;
   means for flipping said input data to align said output data position with the output position of said standard orientation of the given orientation pixel;
   means for performing a classification using said flipped input data;
   means for selecting a filter according to said classification; and
   means for applying said filter to said flipped input data to generate the output data.

16. The apparatus as set forth in claim 15, wherein the input data comprises a plurality of input data points and the output data comprises a plurality of output data points, said means for classifying relative to each output data point and said means for selecting a filter selecting for generation of each output data point.

* * * * *